United States Patent [19]

Petri et al.

[11] Patent Number: 5,592,777
[45] Date of Patent: Jan. 14, 1997

[54] APPARATUS FOR INTERRUPTING OPERATION OF A MOTOR DRIVEN MOVABLE MEMBER UPON CONTACTING AN OBSTACLE

[75] Inventors: Volker Petri, Aidlinger; Reinhold Mickeler, Altdorf; Michael Meyer, Sindelfingen, all of Germany

[73] Assignee: Mercedes-Benz AG, Germany

[21] Appl. No.: 534,156

[22] Filed: Sep. 26, 1995

[30] Foreign Application Priority Data

Sep. 26, 1994 [DE] Germany ............................ 44 34 334.5

[51] Int. Cl.⁶ .................................................. E05F 15/02
[52] U.S. Cl. .................................................. 49/28; 296/223
[58] Field of Search ................................... 49/26, 27, 28; 200/61.43; 296/210, 223

[56] References Cited

U.S. PATENT DOCUMENTS

| | | | |
|---|---|---|---|
| 4,458,446 | 7/1984 | Mochida et al. | 49/28 |
| 5,261,736 | 11/1993 | Sijbarro | 49/28 X |
| 5,299,387 | 4/1994 | Miller et al. | 49/28 |
| 5,459,379 | 10/1995 | Takeda et al. | 49/28 X |

FOREIGN PATENT DOCUMENTS

| | | |
|---|---|---|
| 8814544 | 2/1989 | Germany . |
| 4201019 | 7/1993 | Germany . |

*Primary Examiner*—Kenneth J. Dorner
*Assistant Examiner*—Jerry Redman
*Attorney, Agent, or Firm*—Evenson, McKeown, Edwards & Lenahan P.L.L.C.

[57] ABSTRACT

The invention relates to an apparatus for interrupting the closing operation of an electric motor driven movable closing element, such as a vehicle sunroof when an obstacle which obstructs the closing operation is detected. A pressure-sensitive sensor strip is arranged on the closing edge of the moved closing part and the sensor signal is transmitted in accordance with the transponder principle by an attenuation modulation of an electromagnetic alternating field. The wireless sensor signal which is thus transmitted controls the control device for the electric drive of the closing part. When an obstacle is detected, the drive is switched off or reversed, depending on the sensed pressure applied to the sensor strip. The sensor strip is preferably implemented by a resistive foil pressure sensor.

12 Claims, 1 Drawing Sheet

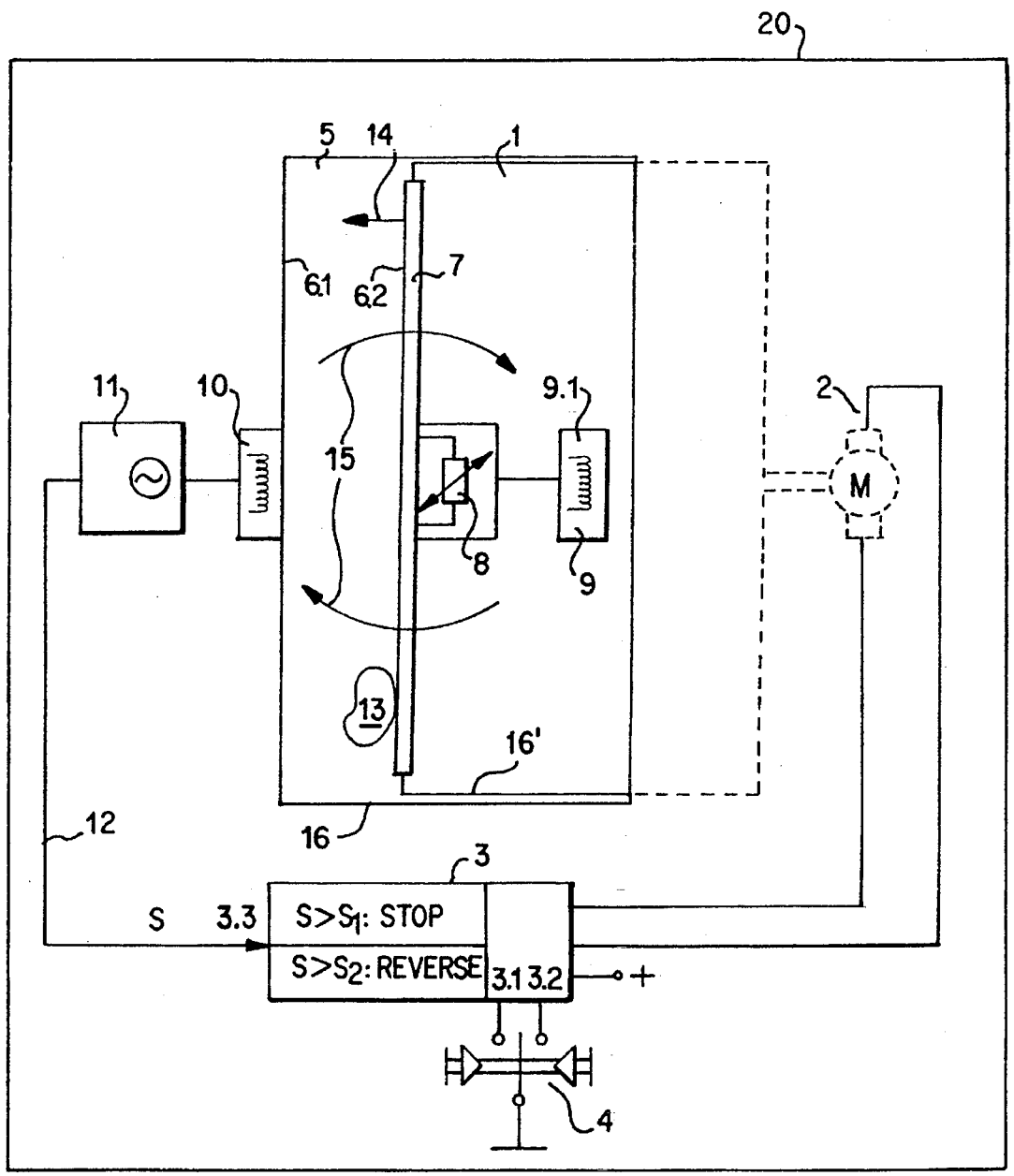

APPARATUS FOR INTERRUPTING OPERATION OF A MOTOR DRIVEN MOVABLE MEMBER UPON CONTACTING AN OBSTACLE

BACKGROUND AND SUMMARY OF THE INVENTION

The invention relates to an apparatus for interrupting the operation of a movable closing member, such a vehicle sun roof, upon encountering an obstacle.

German patent document DE 42 01 019 C2 has disclosed an apparatus of the generic type in which a pressure-sensitive sensor strip is arranged on the stationary closing edge of the opening that can be closed off by the closing member (sliding sunroof). In this way, it is possible in principle to detect obstacles in a highly sensitive manner. Such detection is superior to obstacle identification based on the monitoring of the load current of the electric drive, since the sensor strip responds even in the event of a low pressure load. Such an apparatus is intended to prevent an object, for example a finger, being caught during a closing operation, between the closing edge of the moved closing member and the stationary closing edge at the opening edge. The implementation of the sensor strip by means of a resistive foil pressure sensor is recommended in this publication, for reasons of cost and mechanical reliability. The arrangement of the sensor strip on the stationary closing edge is initially recommended on account of the simple conductor routing and the functional reliability associated therewith.

However, in the case of the known apparatus, the response of the sensor strip arranged on the stationary closing edge can be impaired by covering and guiding parts on the frame or, for example in the case of the sliding sunroof, by the automatically erected draught deflector. This may give rise to the sensor technology failing to identify, in the same way and in good time, the state in which an object is caught for all situations and obstacles.

A further disadvantage of a sensor strip arranged on the stationary closing edge is the late identification of an obstacle which initially impedes only of the moved closing part.

German patent document DE 88 14 544 U1 further discloses a safeguarding apparatus for motor-actuated doors/gates in which, when a sensor strip arranged on the moved closing edge of the door/gate is touched by an obstacle, it emits a control signal for the deactivation of the door/gate drive. The control signal is transmitted to the stationary drive side of the door/gate by a battery-driven radio transmitter.

The object of the present invention is to develop an apparatus of the generic type which can reliably and rapidly identify an obstacle in the way of the closing operation, has a sturdy structure and can suitably switch off or reverse operation of the closing member, in good time.

This object is achieved according to the invention, in which the sensor strip is arranged along the closing edge of the closing member, and the sensor signal is transmitted to a detector unit by attenuation modulation of an alternating electromagnetic field, by means of a transponder. This arrangement has the advantage that the identification of an obstacle in the way of the closing movement is functionally separate from covering and guiding functions on the stationary closing edge. It is thus suitable for a range of motor-moved closing parts in motor vehicles. Such closing parts are, for example, sliding sunroofs, lowerable windows, tailgates, boot lids and door-closing devices.

An additional advantage of the invention is that an obstacle in the way of the closing movement is detected immediately when it first touches the closing part. Therefore, the closing operation is terminated even before an obstacle is caught as a result of its being supported against the stationary closing edge. The arrangement of the sensor strip on the moved closing edge has the further advantage that, when confronted with the risk of an object being caught, the intuitive attempt to stop the closing movement by exerting a counterforce on the moved closing edge achieves the desired effect, namely the interruption of the closing operation.

In a further advantageous embodiment, after the sensor causes the sliding sunroof to stop when it contacts an obstacle, the drive is reversed only when the pressure applied to the sensor strip exceeds a specific threshold after the sliding sunroof has been halted.

The wireless transmission of the sensor signal from the moved closing member to the electronic control device for the drive of the closing member by means of electromagnetic (also inductive or transformer) coupling has the advantage that costly signal line routing, which is susceptible to interference, by means of sliding action contacts or lines laid in loops, (which must be held tight by springs), is no longer necessary. Furthermore, in order to dispense with a supply line for operating a sensor-side transmitter, a sensor-side, independent power supply, (for example, a battery), can be provided. Far more advantageous is the inventive use of the transponder principle, in which a supply line, or a sensor-side independent power, supply for providing the transmitting power, is unnecessary.

Other objects, advantages and novel features of the present invention will become apparent from the following detailed description of the invention when considered in conjunction with the accompanying drawings.

BRIEF DESCRIPTION OF THE DRAWINGS

The single figure of the drawing shows a schematic view of a control apparatus according to the invention.

DETAILED DESCRIPTION OF THE DRAWING

The drawing shows a roof of a vehicle 20 (shown schematically having a sliding sunroof 1 as the closing member in a partly opened position. The vehicle roof has an opening 5 which can be closed off by the sliding sunroof 1. The sliding sunroof 1 can be linearly displaced by the drive 2, including an electric motor M, in a conventional manner (not illustrated in detail), in both the illustrated closing direction 14, and the opposite direction. As a result of inattentive switching-on of the drive 2 in the closing direction 14, an obstacle 13 situated at the level of the opening 5 may touch the moved closing edge 6.2 and be carried along by the latter until it is caught between the stationary closing edge 6.1 and the moved closing edge 6.2. The sensor strip 7 arranged along the moved closing edge 6.2 is used to timely detect an obstacle 13 pressing on the moved closing edge 6.2.

The reversible drive 2 can be switched on via an electronic control device 3, in a manner known per se, by means of a manually operable control switch 4. In this embodiment, the control switch 4 is designed as a changeover switch having a neutral center position, and alternately connects to ground a first control input 3.1 for closing the sliding sunroof, and a second control input 3.2 for opening the sliding sunroof. A third control input 3.3 is driven by the sensor signal 12 which corresponds to the signal from the sensor strip 7. As soon as the sensor signal 12 exceeds a specific threshold, the movement of the drive 2 is interrupted or reversed.

The signal from the sensor strip 7 is transmitted in accordance with the transponder principle by means of an alternating electromagnetic field 15 having a constant frequency of above 100 kHz. The field is physically altered in a characteristic manner by a response circuit 9 integrated in the moved sliding sunroof 1, depending on the mechanical pressure applied to the sensor strip 7. The change is evaluated on the stationary drive side, in order to derive therefrom the sensor signal 12 which corresponds to the signal from the sensor strip 7.

The alternating field 15 is radiated in the direction of the sliding sunroof 1 from a stationary base station 11 by means of a base antenna 10 in the form of a transmitting coil, and is arranged centrally at an edge of the opening 5. The radiation may either be constant or pulsed, and the pressure applied to the sensor strip 7 is correspondingly interrogated continuously or at discrete time intervals. The response circuit 9 comprises in the simplest case a resonant circuit tuned to the frequency of the alternating field 15 and having a receiving coil 9.1 which is damped by the electrical resistance of the resistive foil pressure sensor 8 provided as the sensor strip 7. As the resonant circuit is damped, the alternating field 15 is damped correspondingly, and such damping is evaluated within the base station 11. Using this method of damping modulation, the base station 11 determines and forwards to the control device 3 a sensor signal 12 which corresponds to the signal from the foil pressure sensor 8 forming the sensor strip 7.

Since power transmission is possible to a small extent due to the alternating field 15, the response circuit 9 may also contain an active electronic unit. By means of the latter, a conditioned analog or digital signal influenced by the sensor strip 7 can be communicated to the base station 11 by means of attenuation modulation. Digital transmission would have the advantage, for example, that the signal transmission could be configured to be less susceptible to interference. Moreover, it is further possible for an active electronic unit fed by the alternating field 15 to have a dedicated transmitting circuit for radiating over a dedicated carrier frequency a wave signal which is amplitude or frequency modulated according to the signal from the sensor strip 7.

The use of a resistive foil pressure sensor 8 as the sensor strip 7 is not critical. A simple switching strip which switches the response circuit 9 into a different state in the event of a pressure load is also suitable for this purpose. The use of resistive foil pressure sensors is recommended, however, in part because such sensors do not have any mechanical components. In the unloaded state, the electrical resistance between the two connections of the foil pressure sensor is high (approximately 1–10 megohms). As the applied pressure increases, the resistance decreases by up to three powers of ten, so that quantitative detection of the applied pressure is also possible. Resistive pressure sensors of this type are well known. See, for example, German patent document DE 42 01 019 C2 (already cited).

If a resistive foil pressure sensor 8 is used for the sensor strip 7, then the coil 9.1 may advantageously be integrated in the foil pressure sensor 8, and produced in a single step with the conductor track layer of the foil pressure sensor 8.

When using resistive foil pressure sensors 8 for the sensor strip 7, the quantitative detection of the mechanical pressure on the foil surface permits differentiated control of the drive 2 as a function of the force with which the obstacle 13 hinders the closing operation. In the preferred embodiment of FIG. 1, for example, two thresholds $S_1$ and $S_2$ ($S_2 > S_1$) are provided for the sensor signal 12 (S). If the first threshold ($S > S_1$) for the pressure applied to the sensor strip 7 is exceeded, the electric motor M of the drive 2 is switched off (STOP). After a short run-on time, the sliding sunroof 1 comes to a standstill and the applied pressure is interrogated again. The electric motor of the drive 2 is reversed (REVERSE) and the sliding sunroof 1 is completely or partly reopened only if the interrogated value also exceeds the second threshold $S_2$ ($S > S_2$).

This refinement has the advantage that the automatic reopening of the sliding sunroof 1 after identification of an obstacle, which is unnecessary in many cases and therefore inconvenient, does not occur if the obstacle 13, once having touched the sensor strip 7, has been removed or carried along without a relatively large mechanical resistance. In this case, the applied pressure after the sliding sunroof 1 has halted has risen at most by an insignificant amount and remains below the second threshold $S_2$. However, if the obstacle has been caught between the stationary closing edge 6.1 and the moved closing edge 6.2 and, the second threshold $S_2$ has been exceeded due to the applied pressure (which has risen even further during the run-on time mentioned above), then the sliding sunroof 1 is opened in order to release the obstacle 13.

The drawing shows the base antenna 10 and the coil 9.1 arranged centrally on the broad side of the opening 5 and of the sliding sunroof 1, respectively. However, the base antenna may also be arranged along a side 16 of the opening 5. In this case, the base antenna must be designed to be extended in the longitudinal direction—that is to say parallel to the side 16—such that a narrow strip along the long side 16 is adequately supplied with transmitting power (which must be approximately constant along the longitudinal direction). Correspondingly, the moved coil 9.1 of the response circuit 9 can be arranged directly on the side 16' of the sliding sunroof 1. This ensures that the transmitting power is received uniformly by the coil irrespective of the position of the sliding sunroof 1. With this arrangement, the transmitting power of the base station can be significantly lower, because the distance, between the base antenna and the coil of the response circuit, pertinent with regard to the transmitted transmitting power, remains minimal, irrespective of the position of the sliding sunroof 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus adopted to interrupt closing operation of a movable closing member driven by an electric motor in a motor vehicle, upon detection of an obstacle which obstructs such closing operation, said apparatus comprising:

a pressure-sensitive sensor strip which is arranged on a closing edge of said movable closing member, and which emits a signal when pressure is applied;

an electronic control device for controlling said electric motor which drives the closing member, said electronic control device having a control input driven by a sensor signal derived from the signal from the sensor strip, for halting or reversing operation of said motor;

a base station arranged on a stationary part of said vehicle, which generates an alternating electromagnetic field; and a responsive circuit arranged on said closing member and connected to receive said signal from said sensor strip, said responsive circuit being coupled by said electromagnetic field generated by said base station, and being driven by said signal from said sensor strip to modify said electromagnetic field as a function thereof;

wherein said base station evaluates changes in the alternating electromagnetic field, and generates said sensor signal in response thereto.

2. Apparatus according to claim 1 wherein the response circuit comprises a resonant circuit which is tuned to a frequency of the alternating electromagnetic field, with a receiving coil damping of which can be changed by the signal from the sensor strip.

3. Apparatus according to claim 2 wherein the receiving coil is integrated in the sensor strip, which comprises a foil pressure sensor.

4. Apparatus according to claim 1 wherein the sensor strip comprises a resistive foil pressure sensor.

5. Apparatus according to claim 4 wherein electrical resistance of the resistive foil pressure sensor varies inversely with mechanical pressure on a surface of said foil pressure sensor, and wherein the resonant circuit is damped by said resistance.

6. Apparatus according to claim 5 wherein the sensor signal is a measure of applied pressure to the sensor strip, and a drive of the closing member is switched off (STOP) when said sensor signal exceeds a first threshold.

7. Apparatus according to claim 6 wherein after the drive has been switched off (STOP) owing to the first threshold being exceeded and after a run-on time has elapsed, the applied pressure is interrogated again and the drive is reversed (REVERSE) if a second threshold is exceeded.

8. Apparatus according to claim 1 wherein the electromagnetic alternating field is radiated by means of a base antenna which is arranged centrally on an edge of an opening which can be closed off by the closing member, said edge of the opening being perpendicular to a direction of closing of said closing member.

9. Apparatus according to claim 1 wherein the alternating electromagnetic field is radiated by means of a base antenna arranged along an edge of an opening which can be closed off by the closing member, said edge of the opening extending parallel to a, movement direction of said closing member, and said antenna can be extended along the said edge of the opening, whereby said strip is adequately supplied with transmitting power, the transmitting power being approximately constant along a closing direction.

10. Apparatus according to claim 1 wherein the closing member is a sliding sunroof.

11. Apparatus according to claim 1 wherein the response circuit contains an active electronic unit which conditions, according to the signal from the sensor strip, an analog or digital signal which is communicated to the base station by means of attenuation modulation of the electromagnetic alternating field.

12. Apparatus according to claim 1 wherein the response circuit contains an active electronic unit which is fed by the alternating electromagnetic field and has a dedicated transmitting circuit for radiating over a dedicated carrier frequency a wave signal which is amplitude or frequency modulated according to the signal from the sensor strip.

* * * * *